United States Patent [19]
Kuslak et al.

[11] Patent Number: 5,867,699
[45] Date of Patent: Feb. 2, 1999

[54] INSTRUCTION FLOW CONTROL FOR AN INSTRUCTION PROCESSOR

[75] Inventors: John S. Kuslak, Blaine; David C. Johnson, Roseville; Gary J. Lucas, Pine Springs; Kenneth L. Engelbrecht, Blaine, all of Minn.

[73] Assignee: Unisys Corporation, Blue Bell, Pa.

[21] Appl. No.: 686,258

[22] Filed: Jul. 25, 1996

[51] Int. Cl.⁶ .................................. G06F 9/38; G06F 9/30
[52] U.S. Cl. .......................... 395/587; 395/581; 395/583; 395/584; 395/586; 395/595; 395/898
[58] Field of Search ........................... 395/800, 580–591, 395/898, 595–598

[56] References Cited

U.S. PATENT DOCUMENTS

| | | | |
|---|---|---|---|
| 3,577,190 | 5/1971 | Cocke et al. | 395/567 |
| 3,806,888 | 4/1974 | Brickman et al. | 395/444 |
| 4,189,772 | 2/1980 | Liptay | 395/898 |
| 4,212,060 | 7/1980 | Prey | 395/581 |
| 4,225,922 | 9/1980 | Porter | 395/250 |
| 4,354,232 | 10/1982 | Ryan | 395/445 |
| 4,370,711 | 1/1983 | Smith | 395/587 |
| 4,390,946 | 6/1983 | Lane | 395/586 |
| 4,477,872 | 10/1984 | Losq et al. | 395/587 |
| 4,604,691 | 8/1986 | Akagi | 395/383 |
| 4,679,141 | 7/1987 | Pomerene et al. | 395/587 |
| 4,714,994 | 12/1987 | Oklobdzija et al. | 395/383 |
| 4,725,947 | 2/1988 | Shonai et al. | 395/585 |
| 4,755,966 | 7/1988 | Lee et al. | 395/585 |
| 4,763,245 | 8/1988 | Emma et al. | 395/587 |
| 4,764,861 | 8/1988 | Shibuya | 395/383 |
| 4,777,587 | 10/1988 | Case et al. | 395/582 |
| 4,777,594 | 10/1988 | Jones et al. | 395/587 |
| 4,827,402 | 5/1989 | Wada | 395/182.06 |
| 4,831,517 | 5/1989 | Crouse et al. | 395/182.06 |
| 4,835,679 | 5/1989 | Kida et al. | 395/388 |
| 4,847,753 | 7/1989 | Matsuo et al. | 395/585 |
| 4,853,840 | 8/1989 | Shibuya | 395/584 |
| 4,855,904 | 8/1989 | Daberkow et al. | 395/394 |
| 4,855,947 | 8/1989 | Zmyslowski et al. | 395/392 |
| 4,858,104 | 8/1989 | Matsuo et al. | 395/587 |
| 4,860,197 | 8/1989 | Langendorf et al. | 395/585 |
| 4,860,199 | 8/1989 | Langendorf et al. | 395/421.03 |
| 4,870,573 | 9/1989 | Kawata et al. | 395/183.14 |
| 4,872,109 | 10/1989 | Horst et al. | 395/800 |
| 4,875,160 | 10/1989 | Brown, III | 395/569 |
| 4,881,170 | 11/1989 | Morisada | 395/383 |

(List continued on next page.)

OTHER PUBLICATIONS

Smith et al., "Implementing Precise Interrupts in Pipe–lined Processors", May 1988, pp. 562–573.

Hwu et al., "Checkpoint Repair for Out–of–Order Execution Machines", ACM 1987, pp. 18–26.

Sohi et al., Instruction Issue Logic for High Performance, Interruptible Pipelined Processors, ACM 1987, pp. 27–34.

Myers et al., The 80960 Microprocessor Architecture, 1988, 159–183.

Bandyopadhyay et al., Micro–Code RISC Architecture, 19th Southeaster Symposium on System Theory, Mar., 1987, pp. 411–414.

Bandyopadhyay et al., "Combining Both Micro–Code and Hardwired Control in RISC", Computer Architecture News, Sep. 1987.

Hinton et al., "Microarchitecture of the 80960 High Integration Processor", 1988 IEEE International Conference on Computer Design, 1988, pp. 362–365.

*Primary Examiner*—Parshotam S. Lall
*Assistant Examiner*—Bharat Barot
*Attorney, Agent, or Firm*—Nawrocki, Rooney & Sivertson, P.A.

[57] ABSTRACT

Method and apparatus for changing the sequential execution of instructions in a pipelined instruction processor by using a microcode controlled redirect controller. The execution of a redirect instruction by the pipelined instruction processor provides a number of microcode bits including a target address to the redirect controller, a predetermined combination of the microcode bits then causes the redirect controller to redirect the execution sequence of the instructions from the next sequential instruction to a target instruction.

29 Claims, 15 Drawing Sheets

U.S. PATENT DOCUMENTS

| | | | |
|---|---|---|---|
| 4,888,689 | 12/1989 | Taylor et al. | 395/467 |
| 4,890,225 | 12/1989 | Ellis, Jr. et al. | 395/581 |
| 4,891,754 | 1/1990 | Boreland | 395/595 |
| 4,894,772 | 1/1990 | Langendorf | 395/587 |
| 4,905,188 | 2/1990 | Chuang et al. | 395/455 |
| 4,910,664 | 3/1990 | Arizono | 395/588 |
| 4,912,635 | 3/1990 | Nishimukai et al. | 395/585 |
| 4,914,579 | 4/1990 | Putrino et al. | 395/586 |
| 4,916,602 | 4/1990 | Itoh | 395/595 |
| 4,924,376 | 5/1990 | Ooi | 395/383 |
| 4,926,312 | 5/1990 | Nukiyama | 395/395 |
| 4,926,323 | 5/1990 | Baror et al. | 395/585 |
| 4,942,520 | 7/1990 | Langendorf | 395/467 |
| 4,953,121 | 8/1990 | Muller | 395/588 |
| 4,964,046 | 10/1990 | Mehrgardt et al. | 395/250 |
| 4,980,823 | 12/1990 | Liu | 395/463 |
| 4,984,154 | 1/1991 | Hanstani et al. | 395/587 |
| 4,992,934 | 2/1991 | Portanova et al. | 395/385 |
| 5,008,807 | 4/1991 | Krueger et al. | 395/389 |
| 5,014,196 | 5/1991 | Hayashi et al. | 395/800 |
| 5,023,776 | 6/1991 | Gregor | 395/449 |
| 5,025,366 | 6/1991 | Baror | 395/455 |
| 5,040,107 | 8/1991 | Duxbury et al. | 395/392 |
| 5,050,068 | 9/1991 | Dollas et al. | 395/382 |
| 5,051,896 | 9/1991 | Lee et al. | 395/567 |
| 5,081,574 | 1/1992 | Larsen et al. | 395/581 |
| 5,121,473 | 6/1992 | Hodges | 395/587 |
| 5,121,488 | 6/1992 | Ngai | 395/570 |
| 5,136,696 | 8/1992 | Beckwith et al. | 395/587 |
| 5,142,630 | 8/1992 | Ishikawa | 395/581 |
| 5,142,634 | 8/1992 | Fite et al. | 395/587 |
| 5,210,831 | 5/1993 | Emma et al. | 395/587 |
| 5,222,244 | 6/1993 | Carbine et al. | 395/800.41 |
| 5,228,131 | 7/1993 | Ueda et al. | 395/587 |
| 5,237,666 | 8/1993 | Suzuki et al. | 395/587 |
| 5,265,213 | 11/1993 | Weiser et al. | 395/587 |
| 5,280,592 | 1/1994 | Ryba et al. | 395/726 |
| 5,394,530 | 2/1995 | Kitta | 395/587 |
| 5,423,016 | 6/1995 | Tsuchiya et al. | 395/450 |
| 5,434,985 | 7/1995 | Emma et al. | 395/587 |
| 5,434,986 | 7/1995 | Kuslak et al. | 395/392 |
| 5,459,845 | 10/1995 | Nguyen et al. | 395/598 |
| 5,522,084 | 5/1996 | Ando | 395/800.23 |
| 5,524,222 | 6/1996 | Hervin | 395/595 |
| 5,577,259 | 11/1996 | Alferness et al. | 395/800.41 |
| 5,590,293 | 12/1996 | Uhler et al. | 395/581 |
| 5,590,351 | 12/1996 | Sowadsky et al. | 395/800.23 |
| 5,608,886 | 3/1997 | Blomgren et al. | 395/586 |

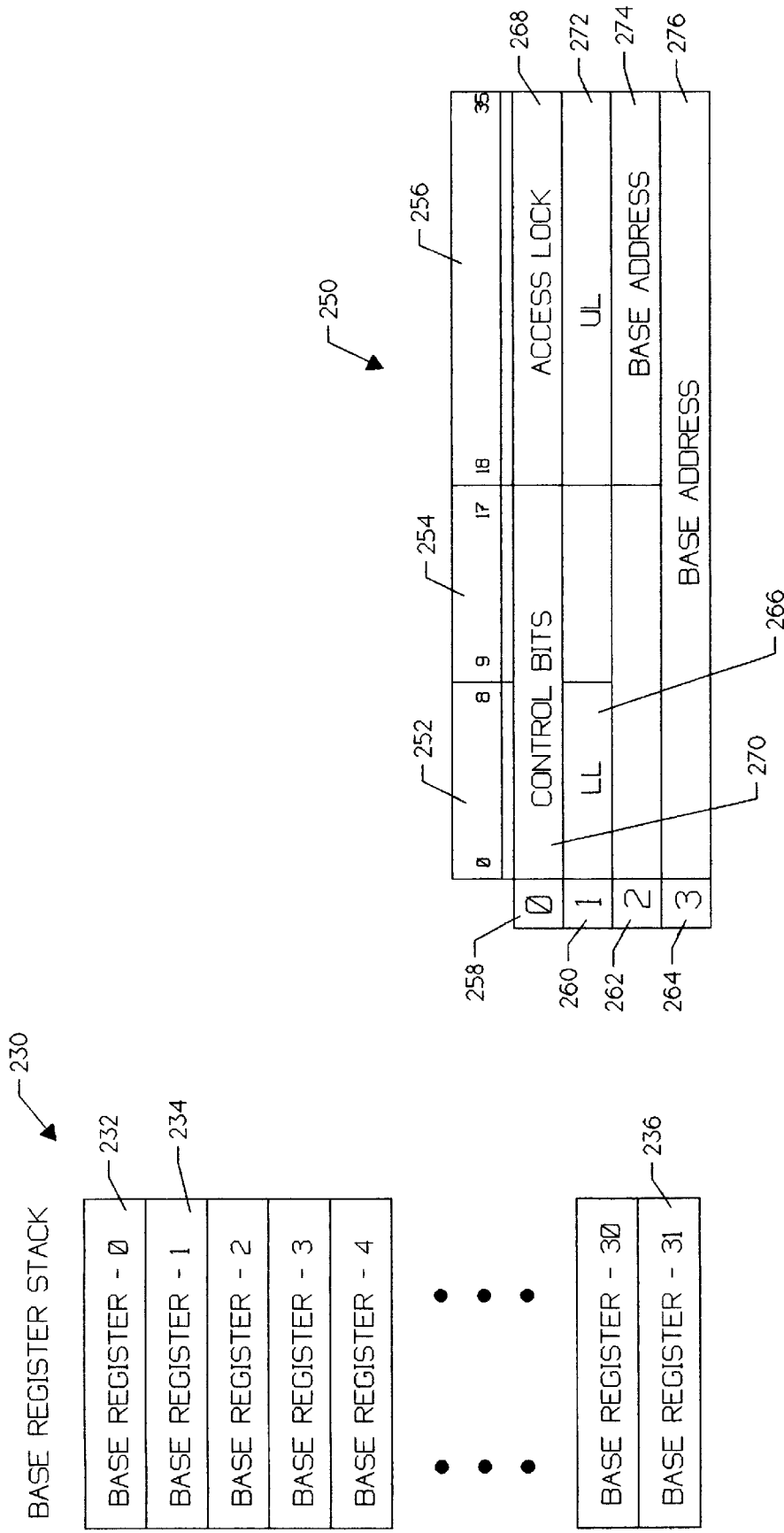

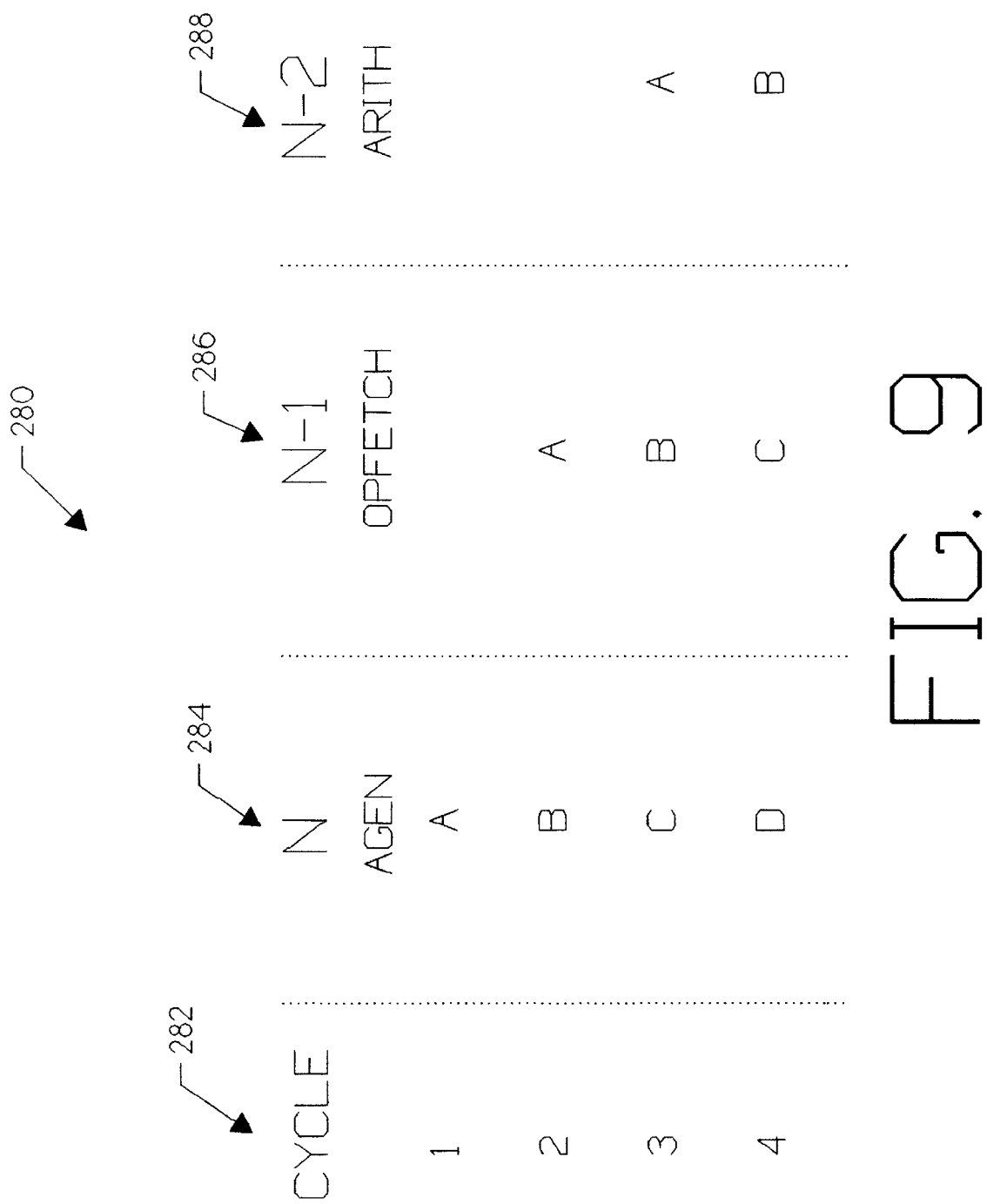

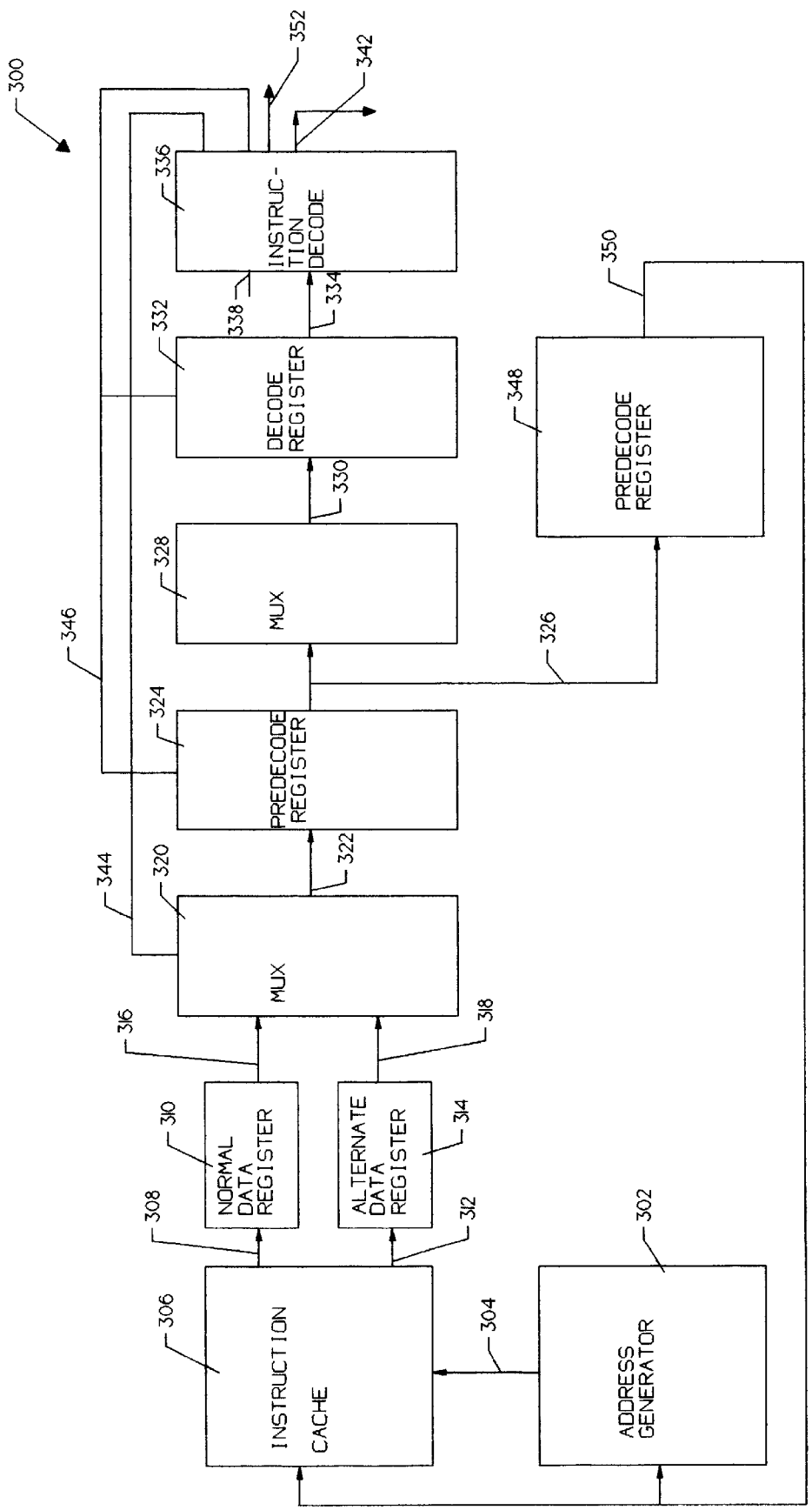

| FUNCTION | DESCRIPTION |
|---|---|
| LOCL | LOCAL CALL |
| CALL | SUBROUTINE CALL |
| GOTO | GO TO |
| RTN | RETURN INSTRUCTION |
| UR | USER RETURN |
| ALL INTERRUPTS | 50 TYPES |
| LD | LOAD DESIGNATOR REQUESTOR |
| LBJ | LOAD BANK AND JUMP |
| LIJ | LOAD INSTRUCTION BANK AND JUMP |
| LDJ | LOAD DATA BANK AND JUMP |
| AAIJ | ALLOW ALTERNATE INTERRUPTS AND JUMPS |
| PAIJ | PREVENT ALTERNATE INTERRUPTS AND JUMPS |

FIG. 11

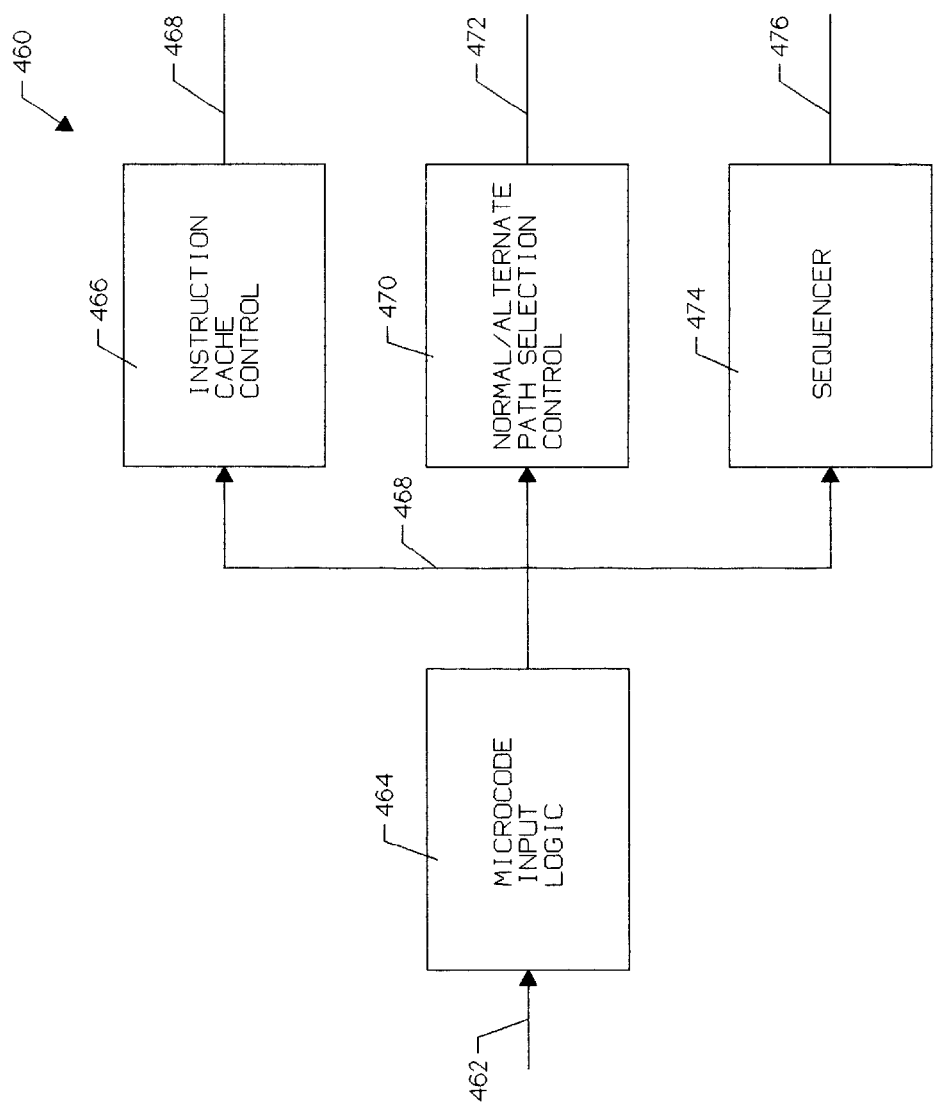

INSTRUCTION FLOW CONTROL FOR AN INSTRUCTION PROCESSOR

CROSS REFERENCE TO CO-PENDING APPLICATIONS

The present application is related to U.S. patent application Ser. No. 08/268,677, filed Jun. 30, 1994, entitled "Interdependency Control of Pipelined Instruction Processor Using Comparing Result of Two Index Registers of Skip Instruction and Next Sequential Instruction", now U.S. Pat. No. 5,434,986; and U.S. patent application Ser. No. 08/288,651, filed Aug. 9, 1994, entitled "Cooperative Hardware and Microcode Control System for Pipelined Instruction Execution", which is a continuation of U.S. patent application No. 07/762,262, now U.S. Pat. No. 5,577,259. These are all assigned to the assignee of the present invention, and are incorporated herein by reference.

BACKGROUND OF THE INVENTION

Field of the Invention

The present invention generally relates to general purpose digital data processing systems, and more particularly relates to such systems that employ redirect or jump commands for instruction processors.

Description of the Prior Art

A key requirement of data processing systems is the ability, through instruction commands, to redirect the flow of machine execution. When processing instructions, instruction processors are often faced with a conditional jump to a non-sequential address, where the jump is based on the outcome of a calculation or another result. In addition, an interrupt can result in an instruction processor jumping to an unsequential address for the next instruction to process. Digital data processing systems often utilize a wide variety of non-jump redirection instructions other than conditional jump instructions which redirect the instruction processor execution. For example, the Unisys ITASCA data processing system has eight instructions and forty-three types of interrupts that can result in redirected instruction processor execution. Data processing systems typically utilize specialized "redirection" logic to support this variety of redirect commands.

Often times the redirection logic in data processing systems utilize a "dual path" logic design to redirect instruction processor execution in order to increase the performance of the instruction execution pipeline. In typical digital data processing systems, instructions are clocked out of an instruction cache into a normal instruction incrementation register. This register typically holds the instruction fetched from the cache by incrementing an address used in a previous fetch. The instruction is then gated through a multiplexer into the instruction pipeline. Once in the instruction pipeline, the instruction is gated through additional predecode and decode registers where the instruction decode begins. When an execution redirection occurs, such as with a conditional jump instruction or a non-jump redirection instruction, an alternate instruction path is selected. A feedback line, such as a jump active line, is set which switches the multiplexer to select a jump target register for the alternate instruction path, rather than the instruction normal execution register. Since the jump target register holds the instruction fetched from the jump target address, this new jump target instruction can be gated into the decode register so that execution can begin with a new instruction stream. The execution continues until the execution is once again redirected.

The dual path design has been used due to enhanced system performance and efficiency. For example, once a decision is made to take a jump, both the jump target instruction and the next instruction in the current instruction stream are already available from the instruction processor instruction cache. There are, however, many inherent disadvantages due to the hardware design having to accommodate both conditional jump instructions and non-jump redirection instructions. First, many of the hardware sequences required for normal conditional jump instructions are unnecessary with non-jump redirection instructions. It is often necessary to execute more complex instructions which perform other tasks other than simply redirecting the execution flow. As a result, hardware logic which simply facilitates redirection may not efficiently perform these other tasks which can include the loading of registers. Often times the designated base registers, which are coupled to instruction decodes and which typically are loaded with predetermined data before a jump is executed, can change in unpredictable ways. This unfortunately can invalidate an otherwise valid jump active signal. It may also not be known if a conditional branch instruction will in fact change the normal sequential execution of the instructions until the third stage (the arithmetic operation stage) of the instruction pipeline. A sequence consisting of an operand fetch may be initiated during the second stage of the pipeline in order to determine whether a jump should be taken during the arithmetic operation or third stage. When executing non-jump redirection instructions, the initiation of these sequences are not necessary and can result in the unintentional corruption of the prefetch instruction pipeline. Thus, when executing a non-jump redirection instruction, pseudo jump instructions must be used in order to accommodate the hardware design. Inputs to the instruction decode registers, which determine whether or not a jump is being taken, are forced to mimic a jump instruction to start hardware sequences which redirect execution in the instruction cache and address generation logic. In addition, special logic must be used to block unnecessary hardware sequences initiated by the pseudo jump instruction.

SUMMARY OF THE INVENTION

The present invention overcomes the disadvantages found in the prior art by providing execution redirect logic which utilizes an instruction processor microcode bit to initiate the execution redirect sequence. The present invention provides execution redirect logic which permits the non-jump redirection instruction to be directly clocked into the normal instruction execution path; thus, not requiring any pseudo jump instructions, where only the conditional jump instructions must be clocked into the alternate instruction path. The present invention also provides execution redirect logic which is greatly simplified in design and has a much higher degree of testability. This is accomplished with execution redirection logic which uses an instruction processor microcode bit to initiate the execution transfer sequence. When the instruction processor microcode bit is set, the main microcode controller issues a signal to the jump start logic which initiates hardware sequences to control execution transfer in the address generation and instruction cache logic. These sequences also load the predecode and decode registers so that no unwanted jump sequences are initiated which must be blocked. The non-jump redirection instruction is loaded directly into the normal instruction execution register, then gated through the multiplexer into the instruction pipeline to the predecode and decode registers where the instruction decode begins. Since the hardware sequences are under microcode control, they can easily be initiated at different times for a variety of non-jump redirection instructions; thus, allowing a much higher degree of design flexibility and testability. The design of the execution redirect logic is greatly simplified since the non-jump redirection instruction is directly clocked into the normal instruction execution path and only the conditional jump instruction must be clocked into the alternate instruction path.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 7 shows an exemplary base register stack;

FIG. 8 shows a typical base register entry;

FIG. 9 schematically shows the operation of the three position pipeline;

FIG. 10 is a block diagram of prior art execution redirection logic;

FIG. 11 is a table of the instructions currently used by the execution redirection logic;

FIG. 14 is a block diagram showing the redirect controller; and

DETAILED DESCRIPTION OF THE PREFERRED EMBODIMENTS

Figure 1:
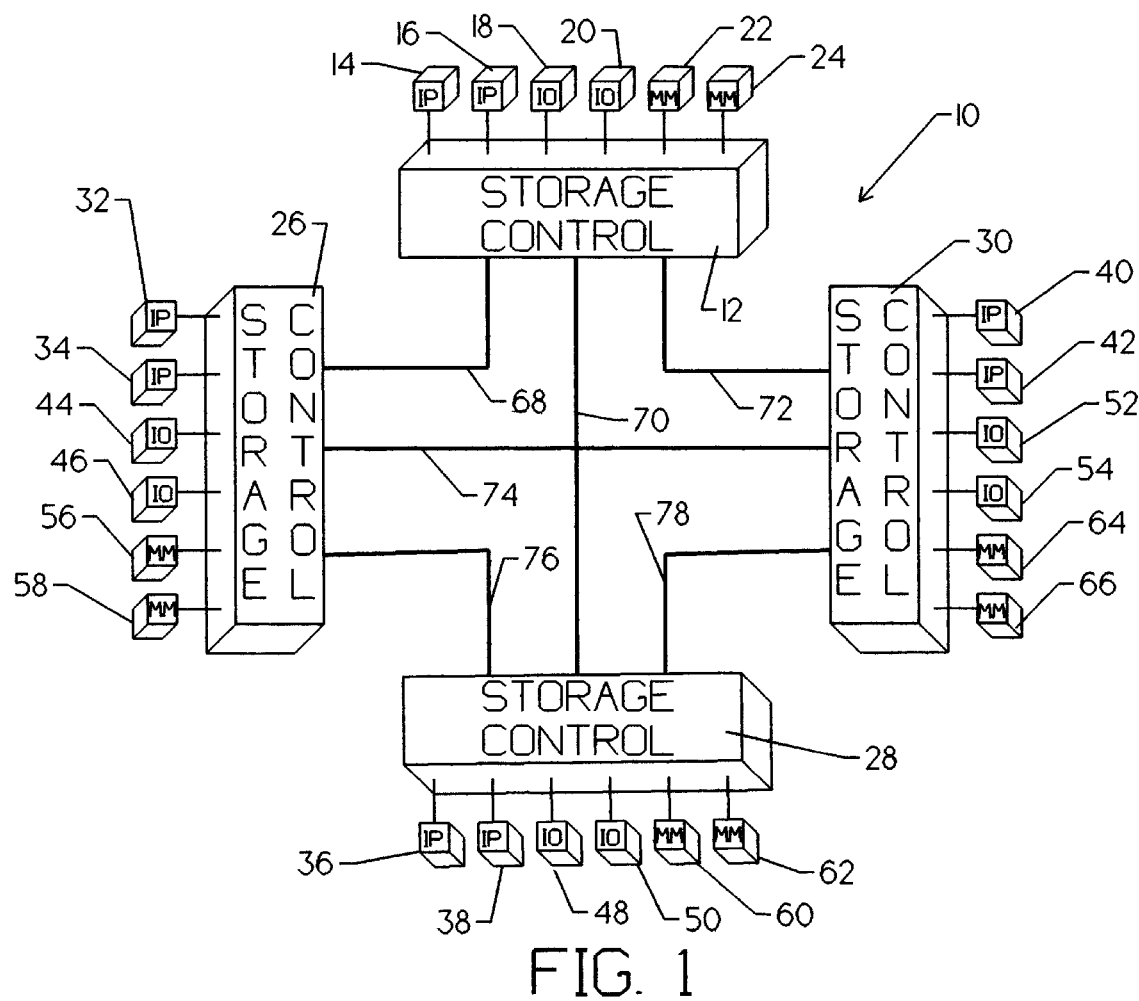
FIG. 1 is a schematic diagram of a fully populated data processing system incorporating the present invention.

FIG. 1 is an overall diagram of fully populated data processing system 10 according to the present invention. Data processing system 10 includes four individual processing clusters, each having its own storage controller and each having point-to-point communication with the other clusters via a storage controller-to-storage controller interface.

Storage controller 12 is coupled to storage controller 26 via interface 68. Similarly, storage controller 12 is coupled to storage controller 28 via interface 70 and to storage controller 30 via interface 72. Storage controller 26 communicates with storage controller 28 via interface 76 and to storage controller 30 via interface 74. In similar fashion, storage controller 28 and storage controller 30 are coupled via interface 78.

Storage controller 12 is fully populated with instruction processor 14, instruction processor 16, input/output processor 18, input/output processor 20, main memory module 22 and main memory module 24. Each of instruction processors 14 and 16 (along with similar instruction processors 32, 34, 36, 38, 40, and 42) has internal dedicated cache resources in the form of an instruction cache and an operand cache. These elements, along with the associated data invalidity logic, are described in more detail below. A more general description of the construction and operation of instruction processors 14 and 16 may be found in the above-referenced and commonly assigned co-pending U.S. Patent Application which has been incorporated by reference.

Input/output processors 18 and 20, along with main memory modules 22 and 24, may be elements currently available, such as found in the Unisys Model 2200/600 series. Input/output processors 44, 46, 48, 50, 52 and 54 and main memory modules 56, 58, 60, 62, 64 and 66 may be similarly found.

Figure 2:
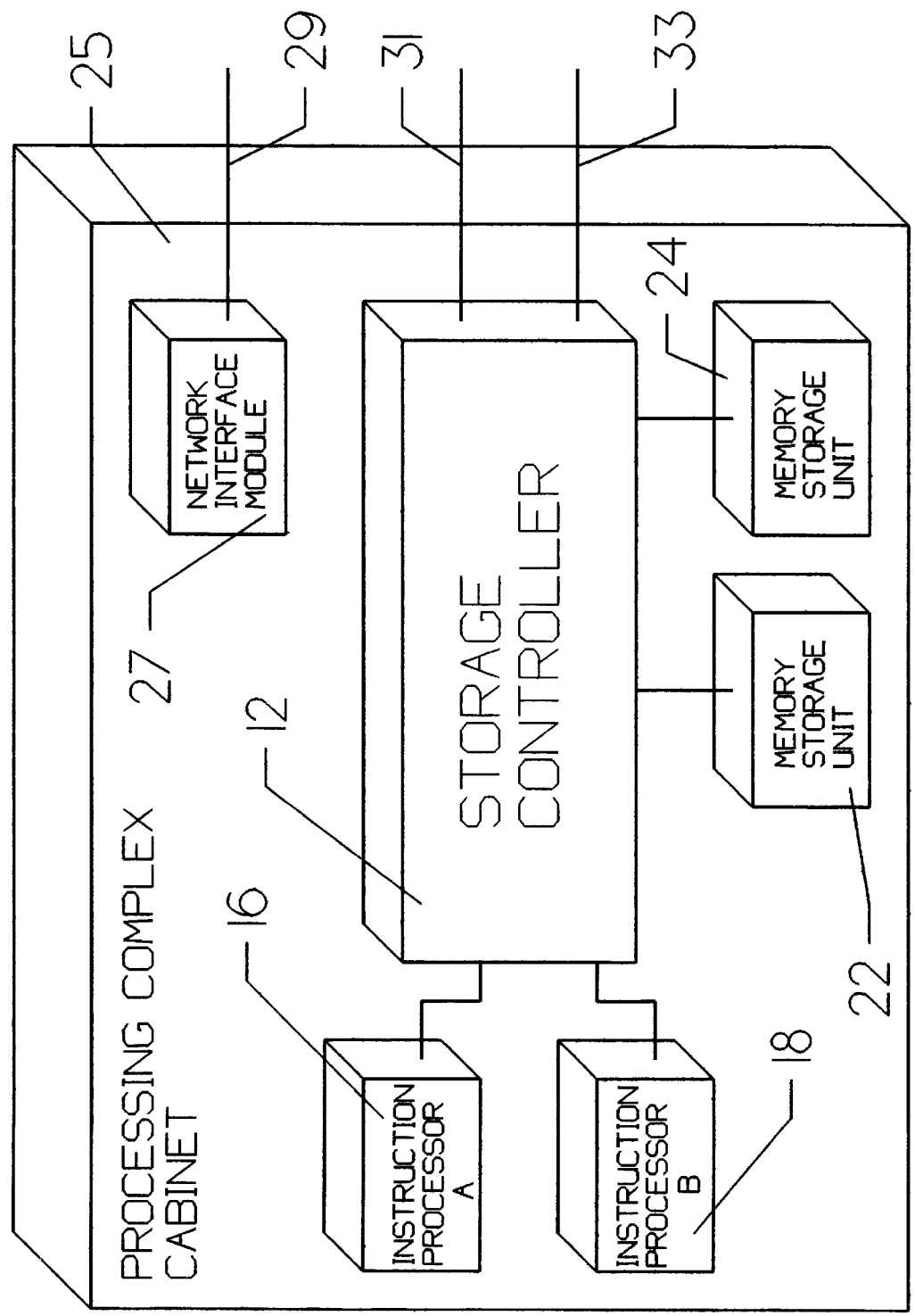
FIG. 2 is a pictorial diagram showing the packaging arrangement of the data processing system of FIG. 1.

FIG. 2 is a schematic diagram showing the packaging of a portion of data processing system 10. A major physical element of data processing system 10 is Processing Complex Cabinet, PCC 25. Within fully populated PCC 25 is located instruction processors 16 and 18 (i.e., IPA and IPB). In the preferred mode, each of these instruction processors is packaged on a single high density circuit board. The memory storage units 22 and 24 are coupled to storage controller 12 as explained above.

Network interface module (i.e., NIM) 27 provide an interface to the operator console via cable 29. Cables 31 and 33 couple input/output units 18 and 20 (see also, FIG. 1) to storage controller 12. Input/output units 18 and 20 are physically packaged in an Input/output Complex Cabinet (i.e., ICC) which is not shown for clarity. Other referenced elements are as previously described.

Figure 3:
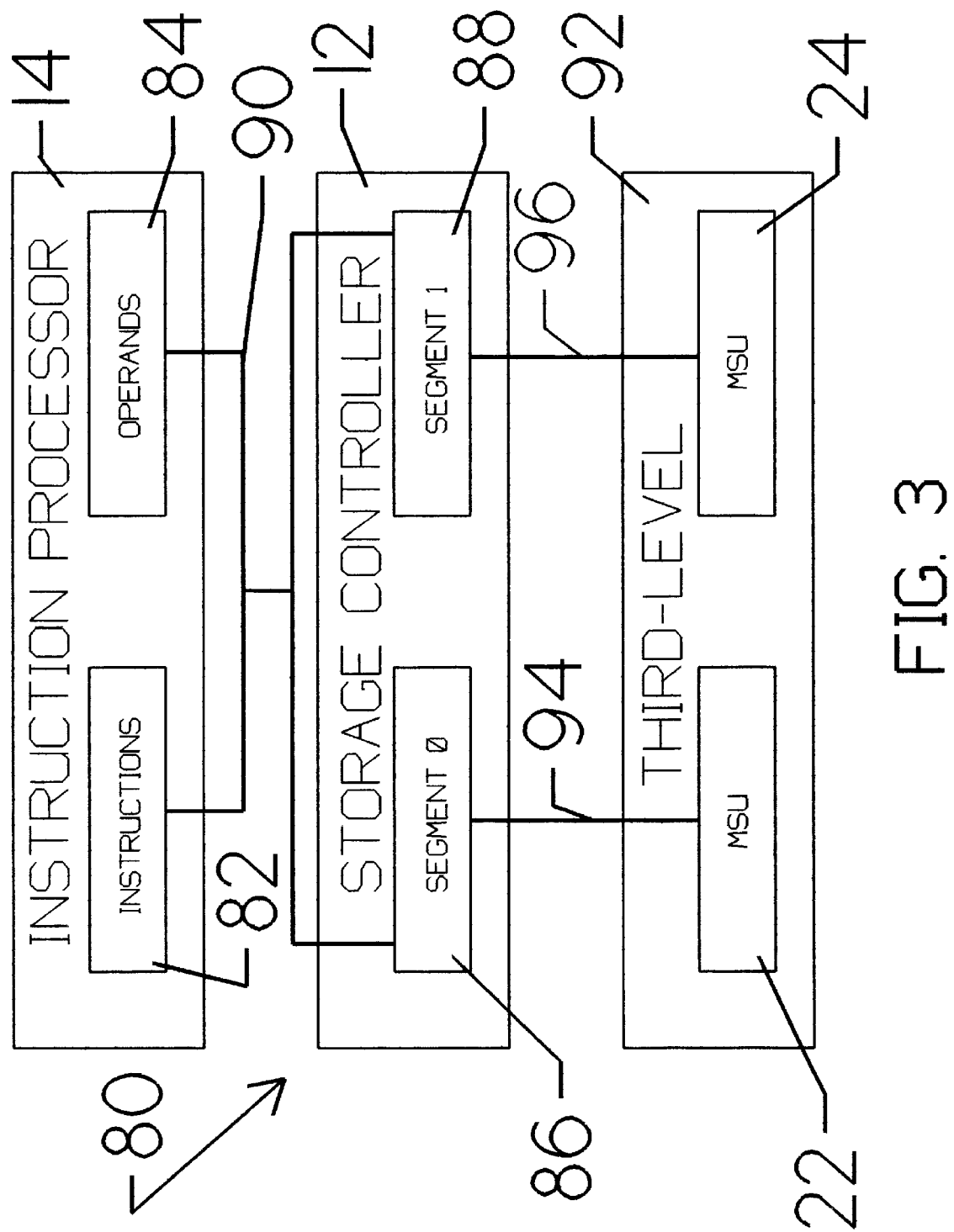
FIG. 3 is a schematic diagram of the levels of storage for a single instruction processor.

FIG. 3 is a flow diagram 80 showing the hierarchical arrangement of the three levels of storage within data processing system 10. Instruction processor 14 contains an instruction cache 82 and an operand cache 84, each storing 8k of 36-bit words. These are internal to instruction processor 14 and dedicated to the operations undertaken therein. By partitioning the internal dedicated cache resources in this manner, there is a certain concurrence of cache accesses associated with normal instruction execution.

Upon the request of instruction processor 14 to access a particular data element as either an instruction or operand, the directory of instruction cache 82 or operand cache 84, respectively, is queried to determine if the required data element is present within the associated cache resource. If the data element is present and valid, the access is completed at that level. If not, access is made to storage controller 12 via interface 90 for the block of eight 36-bit words containing the desired data element. A more detailed explanation of the operation of instruction cache 82 and operand cache 84 is found below.

Storage controller 12 contains an intermediate level cache segment of 128k 36-bit words for each main memory module within the cluster. In the present illustration, storage controller 12 contains segment 0 cache 86, and segment 1 cache 88. These cache resources are shared by all users of the main memory within the cluster to include both local and remote users. Any memory request to storage controller 12 is routed to the appropriate directory of segment 0 cache 86 or segment 1 cache 88 to determine if the desired data element is present and valid. This routing is based upon the address requested, since the intermediate cache resources are partitioned in address space to correspond to the associated main memory module.

If present and valid, the requested data element is supplied as an eight word block. If the requested data element is not validly present in segment 0 cache 86 or segment 1 cache 88 (depending upon the requested address), the data is requested from third level storage 92 containing main memory modules 22 and 24 via interfaces 94 and 96, respectively. In the preferred mode, main memory modules 22 and 24 each contain 64 meg. words of storage.

Each data element request to storage controller 12 is made through a separate interface. For a fully populated system, this includes two instruction processors, two input/output processors, and three other storage controllers (see also, FIG. 1). Each data element request is divided between segment 0 cache 86 and segment 1 cache 88 based upon requested address. Only if the requested data element is not validly present in the appropriate intermediate level cache resource is an access request made to third level 92.

Figure 4:
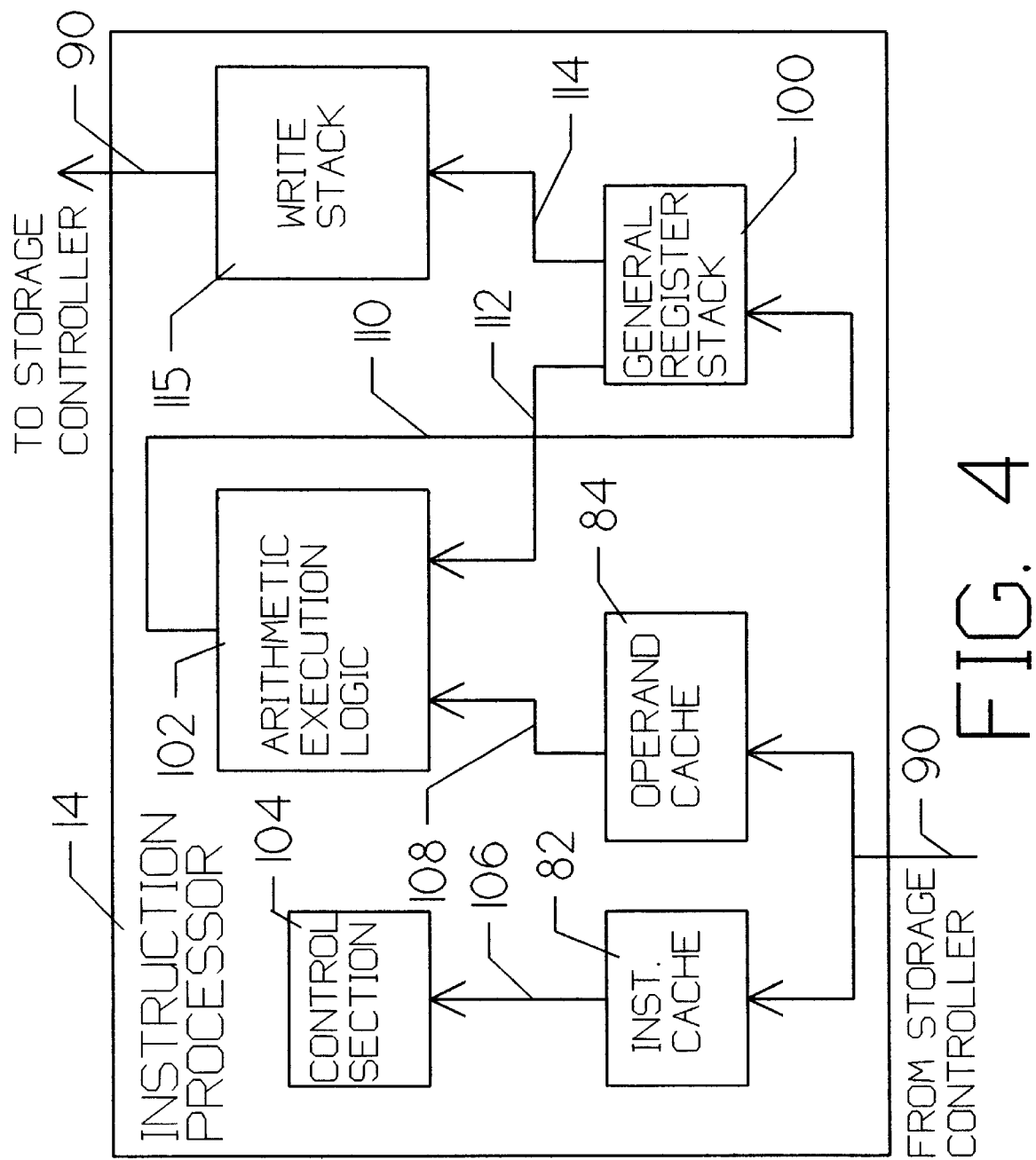
FIG. 4 is a simplified block diagram showing the major elements of the instruction processor.

FIG. 4 is a simplified block diagram of instruction processor 14 showing the major data and control paths. Cable 90, providing the data transfer path between storage controller 12 and instruction processor 14, is actually a two-way path. Data is accessed by storage controller 12 and routed to either instruction cache 82 or operand cache 84 depending upon whether the initial request was for instruction data or operand data. In accordance with usual local cache operation, instruction cache 82 and operand cache 84 temporarily store the data for use by instruction processor 14. Cable 90 also couples write data from write stack 115 to storage controller 12 for longer term storage. Priority for this shared interface is ordinarily given to read data requests requiring write data to be queued in write stack 115. The exception to giving priority to read data is whenever data is to be read from a location for which a write access has been queued.

Instructions from instruction cache 82 are provided via path 106 to control section 104 for decoding via microcode controller and hardwired control logic. Arithmetic execution logic 102 receives operand data via path 108 and performs the specified operation using a combination of microcode control and hardwired control as explained in greater detail below.

Most arithmetic instructions operate upon data which is temporarily stored in general register stack 100. This permits most rapid access to the data, because that data is directly accessed from an extremely fast storage stack. Similarly, arithmetic results are often returned to general register stack 100 for temporary storage until further arithmetic processing. Data is routed to general register stack 100 by path 110. Data from general register stack 100 is routed back to arithmetic execution logic 102 via path 112 and to write stack 115 via path 114. The data transferred to write stack 115 is queued for storage by storage controller 12 as discussed above.

Figure 5:
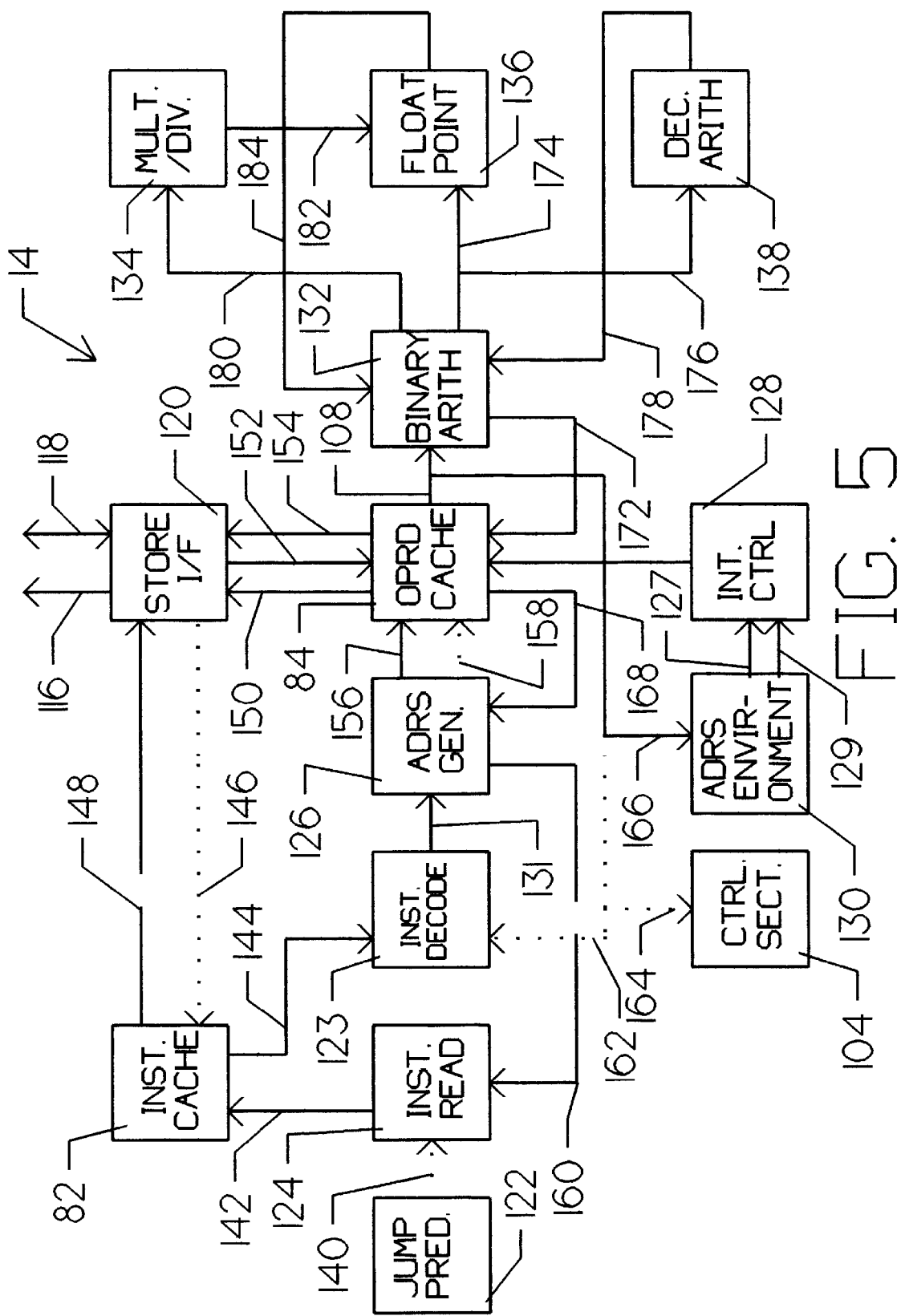
FIG. 5 is a detailed block diagram of the instruction processor.

FIG. 5 is a more detailed block diagram of instruction processor 14. The major data paths are shown, with the solid line paths signifying 72 bit, double word, transfer paths; the dashed line paths signifying addressing paths; and the dotted lines indicating data paths of no greater the 36 bits. Control line paths are not shown for clarity.

The interface to storage controller 12 is via cable 90, as described above. It consists of write cable 116 and read/write cable 118. Each of these data paths couples a 72-bit double word in parallel fashion. The function of write stack 115 (see also FIG. 4) is incorporated within store interface 120 which also provides the request/acknowledge synchronization logic. Addressing information for store interface 120 is sent from instruction cache 82 via cable 148 and operand cache 84 via cable 150 for a corresponding cache miss. Instructions are sent to instruction cache 82 via path 146. Because instructions are 36-bit words, path 146 has a width of 36 bits. Operand data read by storage controller 12 is transferred from store interface 120 to operand cache 84 by path 152. Similarly, write operand data is sent from operand cache 84 to store interface 120 via path 154. Both path 152 and path 154 have a width of 72 bits to accommodate double word operands.

Instructions to be executed are addressed by instruction read 124. The addresses are computed using one of the base registers located within address environment 130. If the instruction is the next sequential instruction, its address is determined by incrementing the program address counter. If the instruction to be executed is addressed by a branch or jump instruction, the address may be computed by address generator 126 and supplied via path 160. Alternatively, the address may be supplied by jump prediction 122 via path 140 during operation in the jump prediction mode as explained in detail below. The address of the next instruction is provided to instruction cache 82 via path 142.

The next addressed instruction is fetched from instruction cache 82 if a match is found. If the request results in a cache miss, storage controller 12 is requested to read the memory block containing the instruction as discussed above. In either case, the instruction is provided to instruction decoder 123 via path 144. The instruction is decoded through the use of a microcode controller by instruction decode 123, and the operand address is computed by address generator 126 from the data received via path 131.

Operand cache 84 contains general register-stack 100 (see also, FIG. 4). The cache is addressed by the output of address generator 126 received from path 158. Direct operands are received on path 156. If a match is not made in operand cache 84, a read request is made of storage controller 12 through store interface 120 as explained above. If a match is found in operand cache 84 or if the instruction specifies a direct operand received on path 156, the operand data is more immediately produced. In either case, the operand data is routed in accordance with the operation to be performed as specified by the instruction. Indirect operands cause the new operand address to be transferred to address generator 126 via path 168. Operands are transferred to binary arithmetic 132 for mathematical computation via path 108 or to address environment 130 via path 166.

Binary arithmetic 132 provides the basic control for all arithmetic operations to be performed on data received via path 108. Floating point operations are scaled and controlled by floating point logic 136 which receives operand data on path 174. Floating point results are returned to binary arithmetic 132 by path 184. Mult./div. 134 performs the basic multiplication and division operations for fixed point instructions. Operand data is received via path 180 and the products/quotients returned via path 182 and floating point logic 136. Decimal arithmetic 138 receives operand data on path 176 and returns results via path 178. Decimal arithmetic performs special purpose decimal operations.

Another category of instructions involves a change to the base registers within the addressing environment 130. The data is supplied to addressing environment 130 via path 166. Base register contents are supplied to interrupt control 128 via paths 127 and 129. Interrupt control 128 provides the interrupt data to operand cache 84 via path 170. Control section 104 provides the overall microcode control.

The operation of instruction processor 14 is intended to occur in the pipelined mode whenever feasible. The preferred mode utilizes a three stage pipeline. The timing of this pipelined operation may be found below and in U.S. patent application Ser. No. 07/762,276, entitled "Data Coherency Protocol for Multi-Level Cached High Performance Multiprocessor System", now abandoned which has been incorporated herein by reference. The remaining referenced components are as previously discussed.

Figure 6:
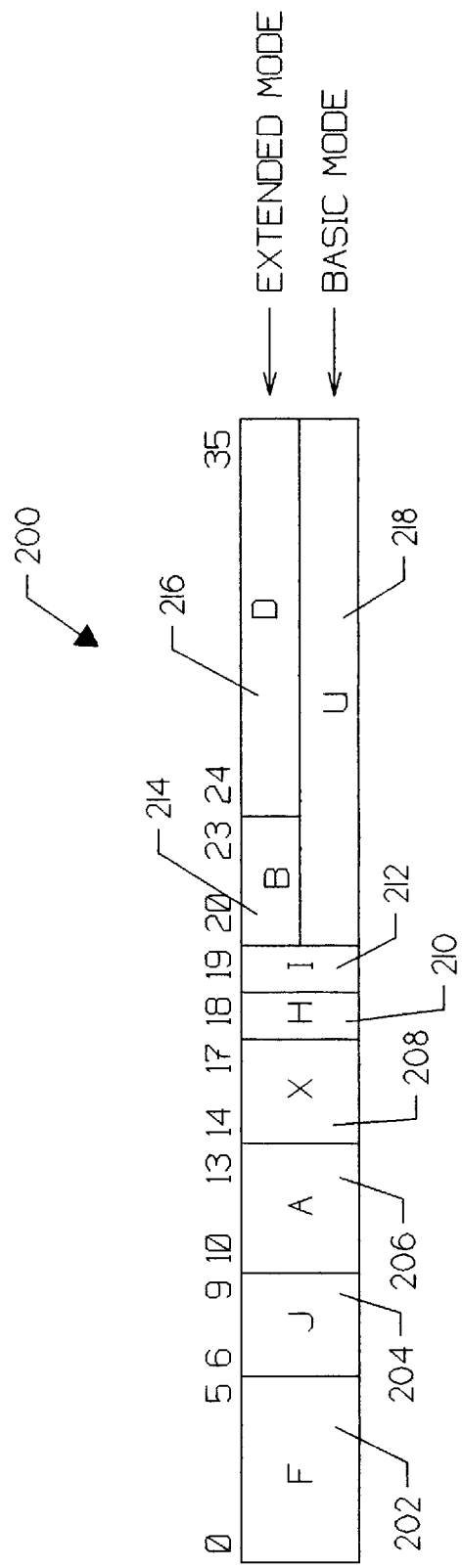
FIG. 6 shows the fields of a typical 36-bit machine instruction in both extended mode and basic mode format.

FIG. 6 shows the field format of a typical 36-bit machine instruction in both extended mode and basic mode format. The diagram is generally shown at 200. The F-field 200 or Function Code, including bits 0 through 5, specifies the operation to be performed by the instruction. The J-field 204, including bits 6 through 9, is sometimes combined with the F-field 200 to act as part of the Function Code, but usually represents an instruction operand qualifier indicating whether the instruction operand is the entire 36-bit word specified by the instruction operand address, a subfield of that word or the instruction operand address itself (immediate operand). The A-field 206, located at bits 10 through 13, is usually the register operand address specifying the address of the register containing the operand. However, for some instructions the A-field 206 acts as part of the Function Code 200. The X-field 208, at bits 14 through 17, is the index register (X-register) address specifying an index register to be used in the indexing operation to form the instruction operand address. The H-bit 210 at bit 18 is used to control index incrementation when the X-field 208 of the instruction is non zero. The I-bit 212 at bit 19 indicates indirect addressing in basic mode unless the instruction specifies an immediate operand.

Generally, the "basic mode" denotes a basic set of machine instructions and capabilities, and "extended mode" denotes a set of machine instructions that includes the basic mode instructions plus a set of additional instructions, thereby providing extended operational capability. In extended mode, the I-bit 212 is used either as an extension to the B-field 214 or to indicate whether 18-bit or 24-bit relative addressing will be used. The B-field 214 at bits 20 through 23 in extended mode format is the base register selector which specifies a base register describing the bank containing the instruction operand. The displacement address in extended mode is specified by the D-field 216 (bits 24 through 35) and in basic mode by the U-field 218 (bits 20 through 35). Those fields contain a displacement value that is used in conjunction with the modifier portion of the index register specified by the X-field 208 to form an instruction operand relative address. A further discussion of the instruction format and the operation thereof can be found in the above-referenced U.S. patent application Ser. No. 07/762,282, entitled "Cooperative Hardware and Microcode Control System for Pipelined Instruction Execution", now abandoned.

FIG. 7 shows an exemplary base register stack. The diagram is generally shown at 230. The base register stack comprises a number of addressable base registers 232, 234, and 236. In a preferred embodiment, base register stack 230 comprises 32 base registers as shown. During initialization of an applications program, a selected set of base registers are loaded with a number of fields including a base register address field. Of the 32 base registers, 16 are for assigned for either user or privileged use, and 16 are assigned for privileged use only. Each of the base register fields is described in further detail with reference to FIG. 8.

The base register stack 230 is used to allocate memory to each application program running on the data processing system. This is accomplished by using a virtual addressing scheme, wherein each base register contains a base address which may be used to calculate an absolute address. A further discussion of absolute address generation may be found in the above-referenced U.S. patent application Ser. No. 07/762,282, filed Sep. 19, 1991, entitled "Cooperative Hardware and Microcode Control System for Pipelined Instruction Execution", now abandoned which is incorporated herein by reference.

FIG. 8 shows the format for one entry 250 in one of the 32 base registers. Each entry consists of four 36-bit words (i.e., words 258, 260, 262 and 264), wherein each word has lower quarter 252, second quarter 254, and upper half 256. Word 258 has a number of control bits 270 within lower quarter 252 and second quarter 254. Upper half 256 of word 258 contains access lock 268.

Lower limit 266 is located in lower quarter 252 of word 260. Upper limit 272 is located in upper half 256 of word 260. Upper limit 272 and lower limit 266 are used to set the security limits on user program access to the associated data segment.

The base address consists of portion 274 located in upper half 256 of word 262 and portion 276 located in the entire 36 bits of word 264. In this manner, an absolute storage space of 252 words of 36 bits each can be uniquely addressed by the absolute address.

FIG. 9 is a schematic diagram 280 showing the timing of the basic pipeline operation. Column 282 uniquely identifies the four clock cycles by number, which are used in the present example. Column 284 identifies by clock cycle, the individual instruction (designated A, B, C, and D) controlling the first stage of the pipeline (labeled AGEN), which generates the operand address and controls the microcode branching. Column 286 identifies by clock cycle, the individual instruction controlling the second stage of the pipeline (labeled OPFETCH). Similarly, column 288 identifies which instruction is in control of the third stage of the pipeline (i.e., ARITH).

For instruction A, the instruction decode and operand address generation functions are performed during clock cycle 1. The operand for instruction A is fetched at clock cycle 2. At clock cycle 3, the arithmetic functions of instruction A are performed. Thus, to determine if a conditional branch instruction will change the normal sequential execution of the instructions, the operands fetched during the second stage of the pipeline are used during the third stage to determine if the jump should be taken.

As can be seen in schematic diagram 280, a single instruction (e.g., instruction A) actually requires three clock cycles to complete. However, because each stage of the pipeline operates simultaneously, under ideal conditions, a different instruction completes arithmetic operations (see, column 288) each clock cycle. This provides an effective instruction execution rate of one instruction per clock cycle.

To greatly simplify instruction development, the individual instructions (i.e., instructions A, B, C, and D) are each self sufficient. That is each instruction contains enough information to control each stage of the pipeline during the clock cycle in which that instruction is in control. This arrangement is called staged control in that control information note needed for a particular clock cycle is stored or "staged" for the next clock cycle.

FIG. 10 is a block diagram showing the prior art execution redirection logic 300. The operation of the instruction processor including address generation has been described in detail in FIG. 5 above. Address generator 302 provides the address of the next instruction to be fetched to instruction cache 306 via path 304. The instruction retrieved is a 36-bit machine instruction (see, FIG. 6 above for format). For instructions not causing a branch (during normal machine operation with no redirection occurring), the next instruction address is determined by incrementing a program address counter within address generator 302 and providing the address to instruction cache 306 via path 304. The instruction is then staged in normal data register 310 via path 308. Alternatively, if the address to be executed is addressed by a redirection instruction such as a branch or jump instruction, the jump is detected by predecode control 348 via path 326 which provides control sequences for execution redirection via path 350 to address generator 302 and instruction cache 306. The instruction is then staged in alternate data register 314 via path 318. Both instructions staged are provided to multiplexer 320 via path 316 for the normal data register 310 and via path 318 for the alternate data register 314.

During normal operation with no redirection occurring, the instruction is clocked out of instruction cache 306 into normal data register 310 via path 308. The instruction is clocked through multiplexer 320 via path 316, and subsequently clocked through predecode register 324, multiplexer 328 and decode register 332 via paths 322, 326 and 330, respectively. Once the instruction is gated into instruction decode 336 via path 334, the instruction decode begins.

During execution redirection with a conditional transfer such as a jump instruction, once the jump instruction is clocked into instruction decode 336, the jump active line 344 is set to indicate selection of the jump target instruction. Path 344 is coupled to multiplexer 320 and switches multiplexer 320 to select the alternate data register 314 containing the jump target instruction fetched from the jump target address, rather than normal data register 310 which holds the instruction fetched from instruction cache 306 determined by incrementing the address from a previous fetch. If the jump is taken, the target instruction is gated into decode register 332 via jump control 346, wherein execution continues with the new instruction stream until the execution is once again redirected. The dual-path consisting of normal data register 310 and alternate data register 314 is necessary for conditional jumps to reduce execution time. This is because both the jump target instruction in alternate data register 314 and the next instruction in the normal instruction stream in normal data register 310 must be available once the decision is made whether to take the jump.

There are many types of instructions utilized that change execution flow that do not require the alternate data register 314 utilized for conditional transfers (refer to FIG. 11 below). For example, an LBJ instruction loads a designated base register, then executes a non-conditional jump. This category of instructions typically involves a change to the base registers within the addressing environment 130 as discussed above in FIG. 5. For a conditional jump, a hardware sequence may be initiated resulting in the operand cache 84 (see, FIG. 5) being addressed by address generator 126 to retrieve operand data used as specified by the instruction to determine if the condition exists for a valid jump. Since instruction decode 336 has base register values as an input on path 338, sequence blocker output 342 is provided to block the unwanted hardware sequences normally associated with a conditional jump instruction which are unnecessary for a non-conditional jump instruction. These hardware sequences can unintentionally change the base register input on path 338, thus resulting in a corrupted instruction pipeline.

FIG. 11 shows the instructions currently used by the execution redirection logic to control non-conditional execution transfers. The non-conditional transfer instructions are generally shown at 360. The name of the function is shown in the column at 362. The description of the function is shown in the column shown at 364. "LOCL" refers to a local call command. "CALL" is a subroutine call command. GOTO is a go to command. RTN is a return instruction command. "UR" refers to a user return command. "All interrupts" refers to the 50 types of interrupts which are utilized. "LD" loads the designator register. "LBJ" is a load bank and jump command. LIJ is a load instruction bank and jump command. LDJ is a load data bank and jump command. AAIJ refers to an allowing alternate interrupts and jump command. PAIJ refers to a prevent alternate interrupts and jump command. The above commands change the execution flow, but do not require conditional transfers.

Figure 12:
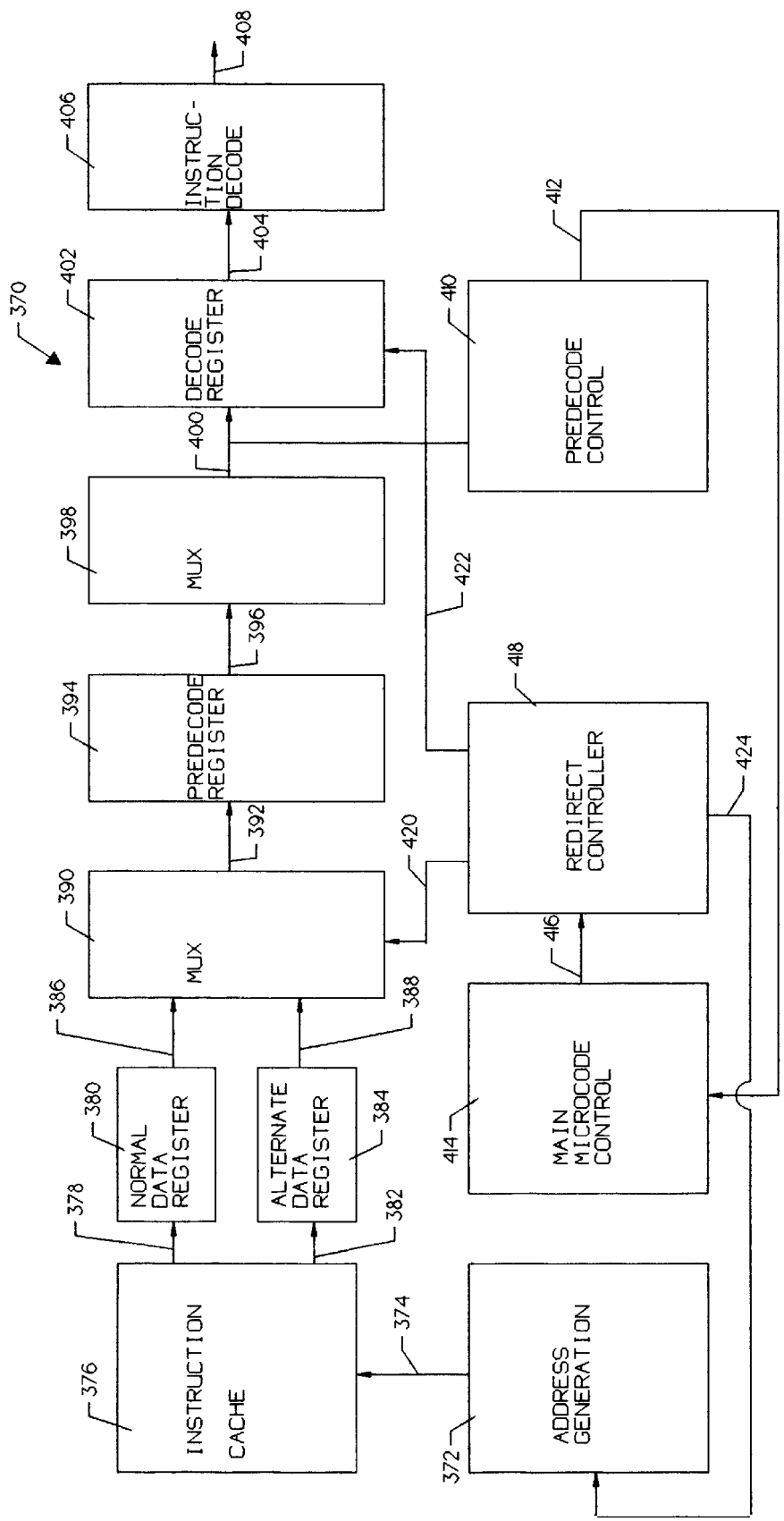
FIG. 12 is a block diagram showing an exemplary embodiment of the present invention.

FIG. 12 is a block diagram showing an exemplary embodiment of the present invention. The microcode-controlled execution redirection logic is shown generally at 370 and is used to facilitate jump-instructions that are not conditional transfers. The operation of the instruction processor including address generation has been described in detail in FIG. 5 above. Address generator 372 provides the address of the next instruction to be fetched to instruction cache 376 via path 374. For instructions not causing a branch (during normal machine operation with no redirection occurring) or for non-conditional redirection instructions, such as those defined above in FIG. 11, the next instruction address is provided by address generator 372 to instruction cache 376 via path 374. The 36-bit machine instruction retrieved (see, FIG. 6 above for format) is then staged in normal data register 380 via path 378. Only conditional jump instructions are staged in alternate data register 384. The instruction is clocked through multiplexer 390 via path 386 to predecode register 394 via path 392, wherein predecode register 394 initiates a plurality of control lines (not shown) to provide an early look at the fetched instruction for other logic blocks within the instruction processor. The F-field, J-field and A-field of the 36-bit machine instruction are decoded to 9 bits by predecode register 394 and clocked through multiplexer 398 via path 396 to decode register 402 and predecode control 410. Instruction decode 406 no longer initiates the execution-transfer sequence (refer to FIG. 10) as the predecode control 410 now sends a 9-bit microcode address to the main microcode control 414 via path 412. Main microcode control 414 contains a look-up Read-Only Memory or ROM (not shown), wherein the 9-bit microcode address selects one of 512 locations within the kilo-bit ROM to determine if the microcode bit is set in order to indicate a non-conditional jump must be initiated. If the microcode bit is set, main microcode control 414 initiates hardware sequences within redirect controller 418 via path 416 to control execution-transfer within the instruction processor. Redirect controller 418 initiates address generation via path 424 within address generation block 372 in order to generate the new target instruction. Redirect controller 418 controls multiplexer 390 via path 420 and selects normal data register 380. Redirect controller 418 initiates sequencing through decode register 402 via path 422 to clock the target instruction into the instruction processor pipeline. Since main microcode control 414 initiates hardware sequences within redirect controller 418, no unwanted jump sequences are initiated which must be blocked.

Figure 13:
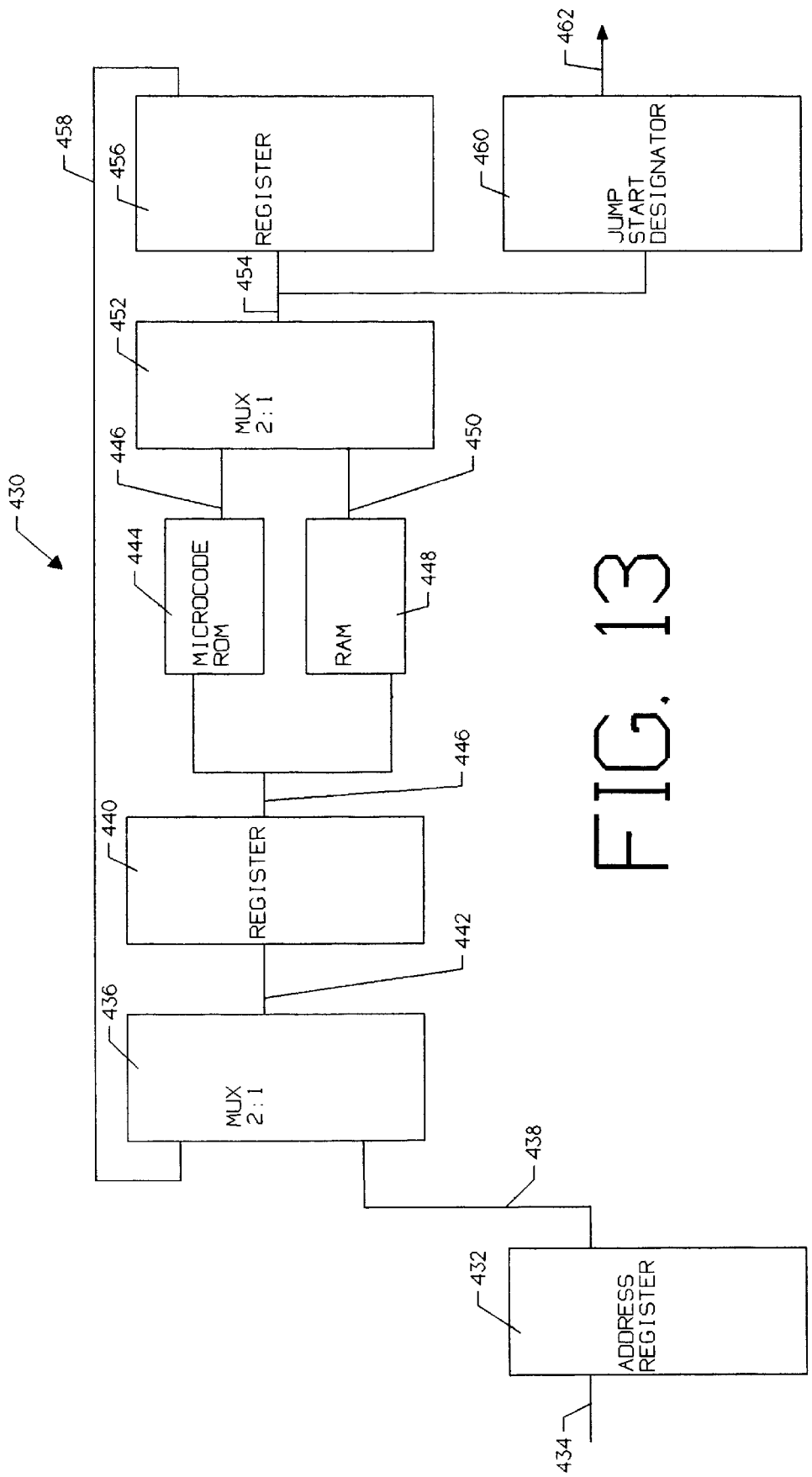
FIG. 13 is a block diagram showing the main microcode control.

FIG. 13 is a block diagram showing the main microcode control 430, and is a more detailed block diagram of the main microcode control 414 shown in FIG. 12. Predecode control 410 (refer to FIG. 12) sends a 9-bit microcode address to address register 432 via path 434. Address register 432 provides the microcode address to multiplexer 436 via path 438, wherein a 2:1 selection is performed. This selection allows the microcode address to be initially clocked through register 440 via path 442 to microcode ROM 444 via path 446. Microcode ROM 444 utilizes the microcode address to select one of 512 locations within the ROM to determine if the microcode bit is set in order to initiate a non-conditional jump. Generally instruction processor 14 (refer to FIGS. 4 and 5) must be depiped whenever an N+1st (or subsequent) instruction is dependent upon an Nth instruction. In the case of non-conditional jump-instructions, the instruction processor may remain in a depiped condition while performing other tasks until it is ready to initiate execution redirection and clock the new target instruction via instruction cache 376 into the instruction processor pipeline. To initiate this delay, microcode ROM 444 couples to multiplexer 452 and to register 456 via paths 446 and 454 respectively to feed back through path 458 to multiplexer 436. RAM 448 couples through path 446 to register 440 and through path 450 to multiplexer 452 and is used for other functions. Once the depiping is complete, if the microcode bit is set, main microcode control 430 clocks a jump start bit via path 454 out of jump start designator 460 via path 462 to initiate hardware sequences within redirect controller 418 in order to control execution-transfer within the instruction processor.

FIG. 14 is a block diagram showing the redirect controller 460 and is a more detailed block diagram of the redirect controller 418 shown in FIG. 12. Redirect controller 460 controls execution redirection within the instruction processor. Main microcode control 414 (see FIG. 13) accesses the look-up ROM to determine if the microcode bit is set which indicates a non-conditional jump must be initiated. If the microcode bit is set, main microcode control 414 initiates hardware sequences within redirect controller 460 via path 462 to control execution-transfer within the instruction processor. Microcode input logic 464 is coupled to input path 462 and initiates the hardware sequences necessary to redirect execution transfer. Instruction cache control 466 is coupled to microcode input logic 464 via path 468 and initiates address generation via path 468 within the address generation block 372 in order to generate the new target instruction. Normal/alternate path selection control 470 is coupled to microcode input logic 464 via path 468. Normal/alternate path selection control 470 controls multiplexer 390 via path 472 and selects the normal data register 380. Sequencer 474 is coupled to microcode input logic 464 via path 468. Sequencer 474 is coupled to decode register 402 via path 476 and clocks the target instruction into the instruction processor pipeline.

Figure 15A:
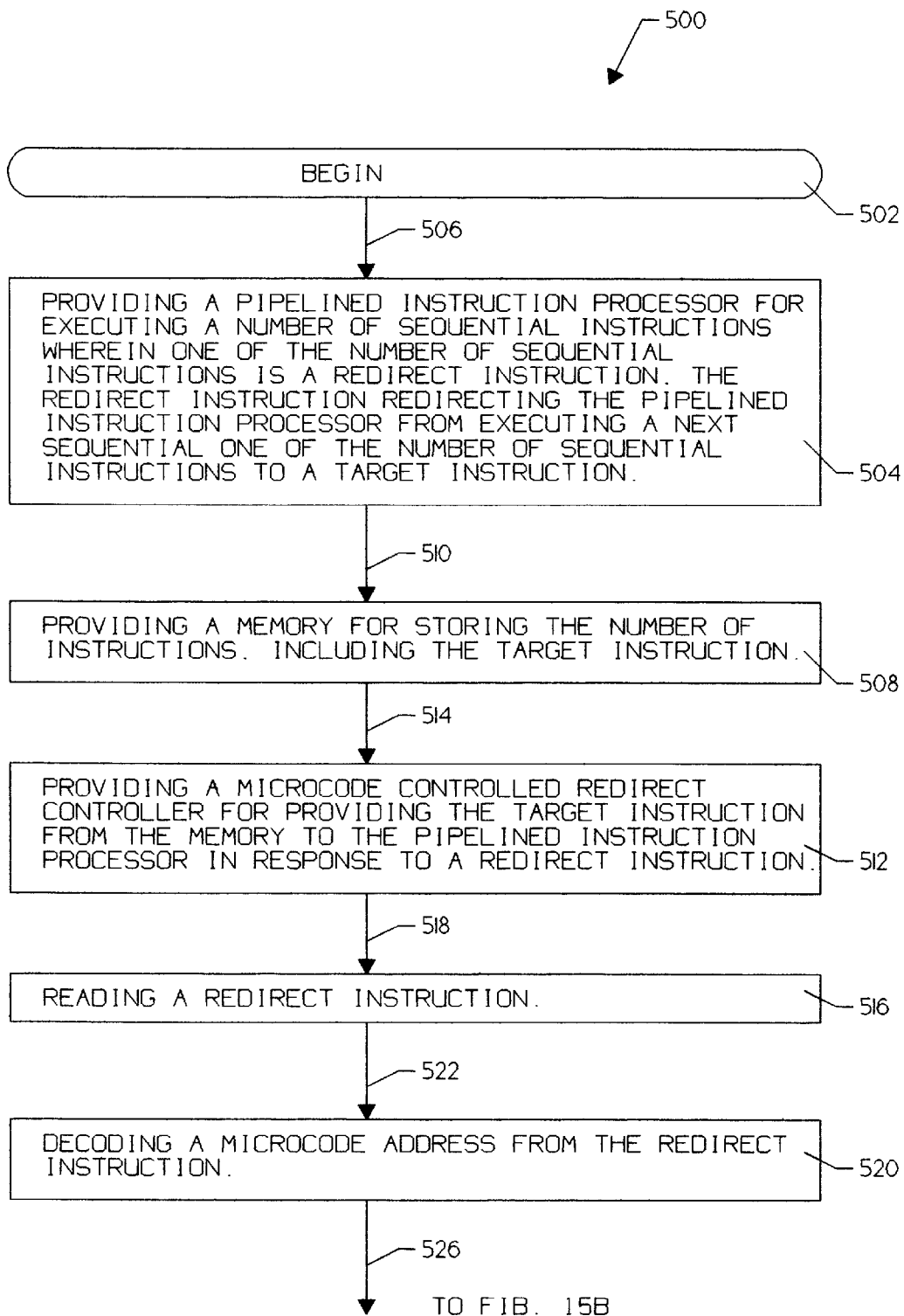
FIGS. 15A and 15B are a flow diagram showing an exemplary method of the present invention.
Figure 15B:
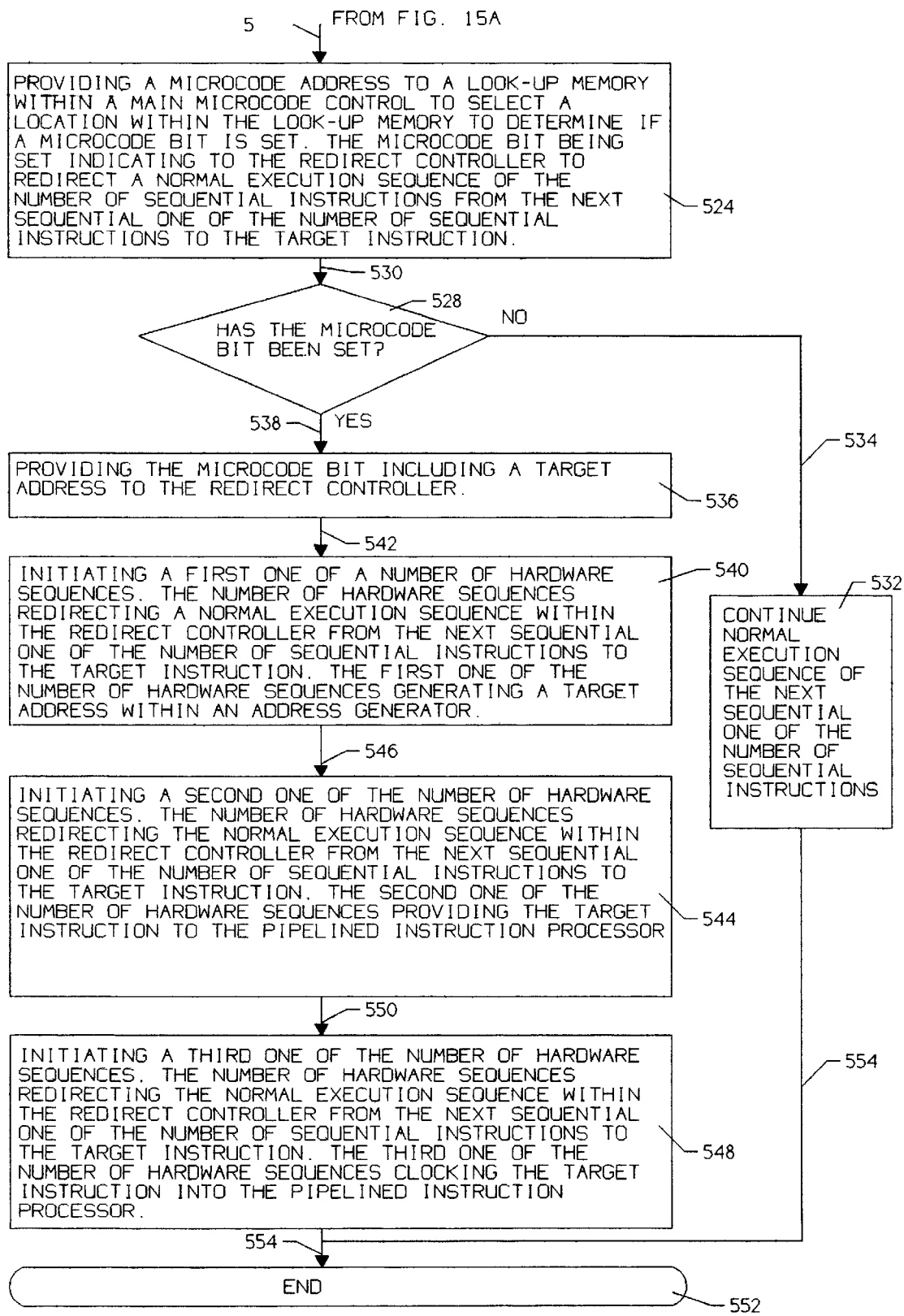

FIGS. 15A and 15B comprise a flow diagram showing an exemplary method of the present invention. The diagram is generally shown at 500. The flow diagram is entered at element 502, wherein control is passed to element 504 via interface 506. Element 504 provides a pipelined instruction processor for executing a number of sequential instructions, wherein one of the number of sequential instructions is a redirect instruction, and where the redirect instruction redirects the pipelined instruction processor from executing a next sequential one of the number of sequential instructions to a target instruction. Control is then passed to element 508 via interface 510. Element 508 provides a memory for storing the number of instructions, including the target instruction. Control is then passed to element 512 via interface 514. Element 512 provides a microcode controlled redirect controller for providing the target instruction from the memory to the pipelined instruction processor in response to a redirect instruction. Control is then passed to element 516 via interface 518. Element 516 reads a redirect instruction. Control is then passed to element 520 via interface 518. Element 520 decodes a microcode address from the redirect instruction. Control is then passed to element 524 via interface 526. Element 524 provides the microcode address to a look-up memory within a main microcode control to select a location within the look-up memory to determine if a microcode bit is set, the microcode bit being set indicating to the redirect controller to redirect a normal execution sequence of the number of sequential instructions from the next sequential one of the number of sequential instructions to the target instruction. Control is then passed to element 528 via interface 530. If the condition of the microcode bit being set is not satisfied, control is passed to element 532 via interface 534. Element 532 continues the normal execution sequence of the next sequential one of the number of sequential instructions. Control from element 532 is then passed to element 552 via interface 554 where the algorithm is exited. If the condition of the microcode bit being set is satisfied, control is passed to element 536 via interface 538. Element 536 provides the microcode bit including a target address to the redirect controller. Control is then passed to element 540 via interface 542. Element 540 initiates a first one of a number of hardware sequences, the number of hardware sequences redirecting a normal execution sequence within the redirect controller from the next sequential one of the number of sequential instructions to the target instruction, the first one of the number of hardware sequences generating a target address within an address generator. Control is then passed to element 544 via interface 546. Element 544 initiates a second one of the number of hardware sequences, the number of hardware sequences redirecting the normal execution sequence within the redirect controller from the next sequential one of the number of sequential instructions to the target instruction, the second one of the number of hardware sequences providing the target instruction to the pipelined instruction processor. Control is then passed to element 548 via interface 550. Element 548 initiates a third one of the number of hardware sequences, the number of hardware sequences redirecting the normal execution sequence within the redirect controller from the next sequential one of the number of sequential instructions to the target instruction, the third one of the number of hardware sequences clocking the target instruction into the pipelined instruction processor. Control is then passed to element 552 via interface 554 where the algorithm is exited.

Having thus described the preferred embodiments of the present invention, those of skill in the art will readily appreciate that the teachings found herein may be applied to yet other embodiments within the scope of the claims hereto attached.

What is claimed is:

1. A data processing system having a pipeline instruction processor for sequentially executing a number of sequential instructions including a currently executed instruction, the number of sequential instructions including unconditional redirect instructions and conditional jump instructions, an unconditional redirect instruction unconditionally redirecting the pipeline instruction processor from executing a next sequential one of the number of sequential instructions to a target instruction specified by the unconditional redirect instruction, the conditional jump instruction conditionally redirecting the pipeline instruction processor from executing the next sequential one of the number of sequential instructions to the target instruction specified by the conditional jump instruction depending on an outcome of a test condition specified by the conditional jump instruction, comprising:
   a. predecode means coupled to the pipeline instruction processor for predecoding a portion of the currently executed instruction to a microcode address having a number of bits;
   b. look-up memory means coupled to said predecode means, said look-up memory means having a number of locations wherein said microcode address selects one of said number of locations within said look-up memory means: and
   c. redirect controller means coupled to said look-up memory means and to the pipeline instruction processor for initiating delivery of the target instruction of the currently executed instruction to the pipeline instruction processor if said one of said number of locations within said look-up memory means indicates that the currently executed instruction is the unconditional redirect instruction, said redirect controller means initiating delivery of said target instruction by initiating a number of sequential hardware sequences, each one of said number of sequential hardware sequences occurring in a predetermined order relative to every other one of said number of sequential hardware sequences said number of sequential hardware sequences generating said target instruction and delivering said target instruction through a single selected data path to said pipeline instruction processor.

2. A data processing system according to claim 1 wherein the single selected data path is a normal data path which provides for normal execution of the target instruction.

3. A data processing system according to claim 1 wherein said selected one of said number of locations within said look-up memory being set indicates to said redirect controller means that the currently executed instruction is said unconditional redirect instruction.

4. A data processing system according to claim 3 wherein the microcode address is a 9 bit address which selects one of 512 locations within said look-up memory.

5. A data processing system according to claim 4 wherein said look-up memory is a ROM.

6. A data processing system according to claim 4 wherein the microcode bit is a jump start bit.

7. A data processing system according to claim 3 wherein the pipeline instruction processor further includes address generator means coupled to said redirect controller means, a first one of said number of sequential hardware sequences initiated by said redirect controller means, generating an address of the target instruction within said address generator means, said first one of said number of sequential hardware sequences being first in said predetermined order.

8. A data processing system according to claim 7 further including an instruction cache means coupled to said address generator means, said instruction cache means having a number of address locations, said instruction cache means providing the target instruction to the pipeline instruction processor in response to said address from said address generator means.

9. A data processing system according to claim 8 wherein the instruction is a 36 bit machine instruction.

10. A data processing system according to claim 8 wherein a second one of said number of sequential hardware sequences initiated within said redirect controller means selects a normal data oath, said second one of said number of sequential hardware sequences being second in said predetermined order so that said normal data path is selected after said first one of said number of sequential hardware sequences.

11. A data processing system according to claim 10 wherein a third one of said number of sequential hardware sequences initiated within said redirect controller means provides the target instruction from said instruction cache means to the pipeline instruction processor, said third one of said number of sequential hardware sequences being third in said predetermined order so that the target instruction is provided from said instruction cache to the pipeline instruction processor after said second one of said number of sequential hardware sequences.

12. A data processing system according to claim 1 wherein the unconditional redirect instruction is an unconditional jump instruction.

13. A data processing system according to claim 1 wherein the unconditional redirect instruction is an interrupt instruction.

14. An apparatus comprising:
   a. processing means for sequentially executing a number of sequential instructions including a currently executed instruction, said number of sequential instructions including unconditional redirect instructions and conditional jump instructions, an unconditional redirect instruction unconditionally redirecting said processing means from executing a next sequential one of said number of sequential instructions to a target instruction specified by said unconditional redirect instruction, a conditional jump instruction conditionally redirecting said processing means from executing said next sequential one of said number of sequential instructions to said target instruction specified by said conditional jump instruction depending on an outcome of a test condition specified by said conditional jump instruction;
   b. redirect means coupled to said processing means for determining if said currently executed instruction is said unconditional redirect instruction or said conditional jump instruction by predecoding a portion of said currently executed instruction to a microcode address having a number of bits; and
   c. look-up memory means coupled to said redirect means and to said processing means, said redirect means initiating delivery of said target instruction specified by said currently executed instruction to said processing means if a one of a number of locations within said look-up memory means selected by said microcode address indicates that said currently executed instruction is said unconditional redirect instruction, said redirect means initiating delivery of said target instruction by initiating a number of sequential hardware sequences, each one of said number of sequential hardware sequences occurring in a predetermined order relative to every other one of said number of sequential hardware sequences, said number of sequential hardware sequences generating said target instruction and delivering said target instruction through a single selected data path to said processing means.

15. An apparatus according to claim 14 wherein said single selected data path is a normal data path which provides for normal execution of said target instruction.

16. An apparatus according to claim 14 wherein said selected one of said number of locations within said look-up memory means being set indicates to said redirect means that said currently executed instruction is said unconditional redirect instruction.

17. An apparatus according to claim 16 wherein the microcode address is a 9 bit address which selects one of 512 locations within said look-up memory means.

18. An apparatus according to claim 17 wherein said look-up memory means is a ROM.

19. An apparatus according to claim 17 wherein the microcode addressing means is a jump start bit.

20. An apparatus according to claim 16 wherein said processing means further includes an address generation means wherein a first one of said number of sequential hardware sequences initiated within said redirect means generates an address of said target instruction within said address generation means, said first one of said number of sequential hardware sequences being first in said predetermined order.

21. An apparatus according to claim 20 further comprising an instruction storage means coupled to said address generation means, said instruction storage means having a number of address locations, said instruction storage means providing said target instruction to said processing means in response to said address from said address generation means.

22. An apparatus according to claim 21 wherein the instruction is a 36 bit machine instruction.

23. An apparatus according to claim 21 wherein a second one of said number of sequential hardware sequences initiated within said redirect means selects a normal data path, said second one of said number of sequential hardware sequences being second in said predetermined order so that said normal data path is selected after said first one of said number of sequential hardware sequences.

24. An apparatus according to claim 23 wherein a third one of said number of sequential hardware sequences initiated within said redirect means provides said target instruction from said instruction storage means to said processing means, said third one of said number of sequential hardware sequences being third in said predetermined order so that said target instruction is provided from said instruction storage means to said processing means after said second one of said number of sequential hardware sequences.

25. An apparatus according to claim 14 wherein said unconditional redirect instruction is a non-conditional jump instruction.

26. An apparatus according to claim 14 wherein said unconditional redirect instruction is an interrupt instruction.

27. A method of redirecting execution in a data processing system wherein the data processing system includes a pipeline instruction processor for sequentially executing a number of sequential instructions including a currently executed instruction, the number of sequential instructions including unconditional redirect instructions and conditional jump instructions, an unconditional redirect instruction unconditionally redirecting the pipeline instruction processor from executing a next sequential one of the number of sequential instructions to a target instruction specified by the unconditional redirect instruction, the conditional jump instruction conditionally redirecting the pipeline instruction processor from executing the next sequential one of the number of sequential instructions to the target instruction specified by the conditional jump instruction depending on an outcome of a test condition specified by the conditional jump instruction, the method comprising the steps of:
  a. providing a redirect controller coupled to the pipeline instruction processor for determining if the currently executed instruction is the unconditional redirect instruction or the conditional jump instruction by predecoding a portion of the currently executed instruction to a microcode address;
  b. executing the currently executed instruction; and
  c. initiating delivery of the target instruction of the currently executed instruction to the pipeline instruction processor if a one of a number of locations within a look-up memory selected by said microcode address indicates that the currently executed instruction is the unconditional redirect instruction said redirect controller initiating delivery of the target instruction by initiating a number of sequential hardware sequences, each one of said number of sequential hardware sequences occurring in a predetermined order relative to every other one of said number of sequential hardware sequences, said number of sequential hardware sequences generating the target instruction and delivering the target instruction through a single selected data path to the pipeline instruction processor.

28. A method of redirecting execution in a data processing system which comprises:
  a. providing a pipeline instruction processor for executing a number of sequential instructions wherein one of said number of sequential instructions is a redirect instruction, said redirect instruction redirecting said pipeline instruction processor from executing a next sequential one of said number of sequential instructions to a target instruction;
  b. providing a memory for storing the number of sequential instructions, including said target instruction;
  c. providing a redirect controller for providing said target instruction from said memory to said pipeline instruction processor in response to said redirect instruction, said redirect controller being microcode controlled, said redirect controller initiating delivery of said target instruction by initiating a number of sequential hardware sequences, each one of said number of sequential hardware sequences occurring in a predetermined order relative to every other one of said number of sequential hardware sequences, said number of sequential hardware sequences generating said target instruction and delivering said target instruction through a single selected data path to said pipeline instruction processor;
  d. reading said redirect instruction;
  e. predecoding a portion of said redirect instruction to a microcode address;
  f. providing said microcode address to a look-up memory within a main microcode control to select a location within said look-up memory to determine if a microcode bit is set, said microcode bit being set indicating to said redirect controller to redirect a normal execution sequence of said number of sequential instructions from said next sequential one of said number of sequential instructions to said target instruction;
  g. initiating a first one of said number of sequential hardware sequences if said microcode bit is set, said first one of said number of sequential hardware sequences generating said target address within an address generator;
  h. initiating a second one of said number of sequential hardware sequences if said microcode bit is set, said second one of said number of sequential hardware sequences selecting a normal data path; and
  I. initiating a third one of said number of sequential hardware sequences if said microcode bit is set, said third one of said number of sequential hardware sequences providing said target instruction from an instruction cache to said pipeline instruction processor.

29. A data processing system comprising:
a. a pipeline instruction processor having an input for sequentially receiving instructions;
b. a selector coupled to said pipeline instruction processor;
c. an instruction cache for providing selected instructions;
d. a normal data register coupled to said instruction cache and to said selector for storing a normal sequence of instructions provided by said instruction cache;
e. an alternative data register coupled to said instruction cache and to said selector for storing target instructions of conditional jump instructions; and
f. redirect means coupled to said pipeline instruction processor, said selector and said instruction cache for determining if a currently executed instruction within said, pipeline instruction processor is a conditional jump instruction or an unconditional redirect instruction; said redirect means causing said alternative data register to accept a target instruction specified by said conditional jump instruction from said instruction cache and causing said selector to select an output of said alternative data register when said currently executed instruction is determined to be said conditional jump instruction; said redirect means causing said normal data register to accept said target instruction specified by said unconditional redirect instruction from said instruction cache and causing said selector to select said output of said normal data register when said currently executed instruction is said unconditional redirect instruction.

* * * * *